United States Patent Office 3,526,149
Patented Sept. 1, 1970

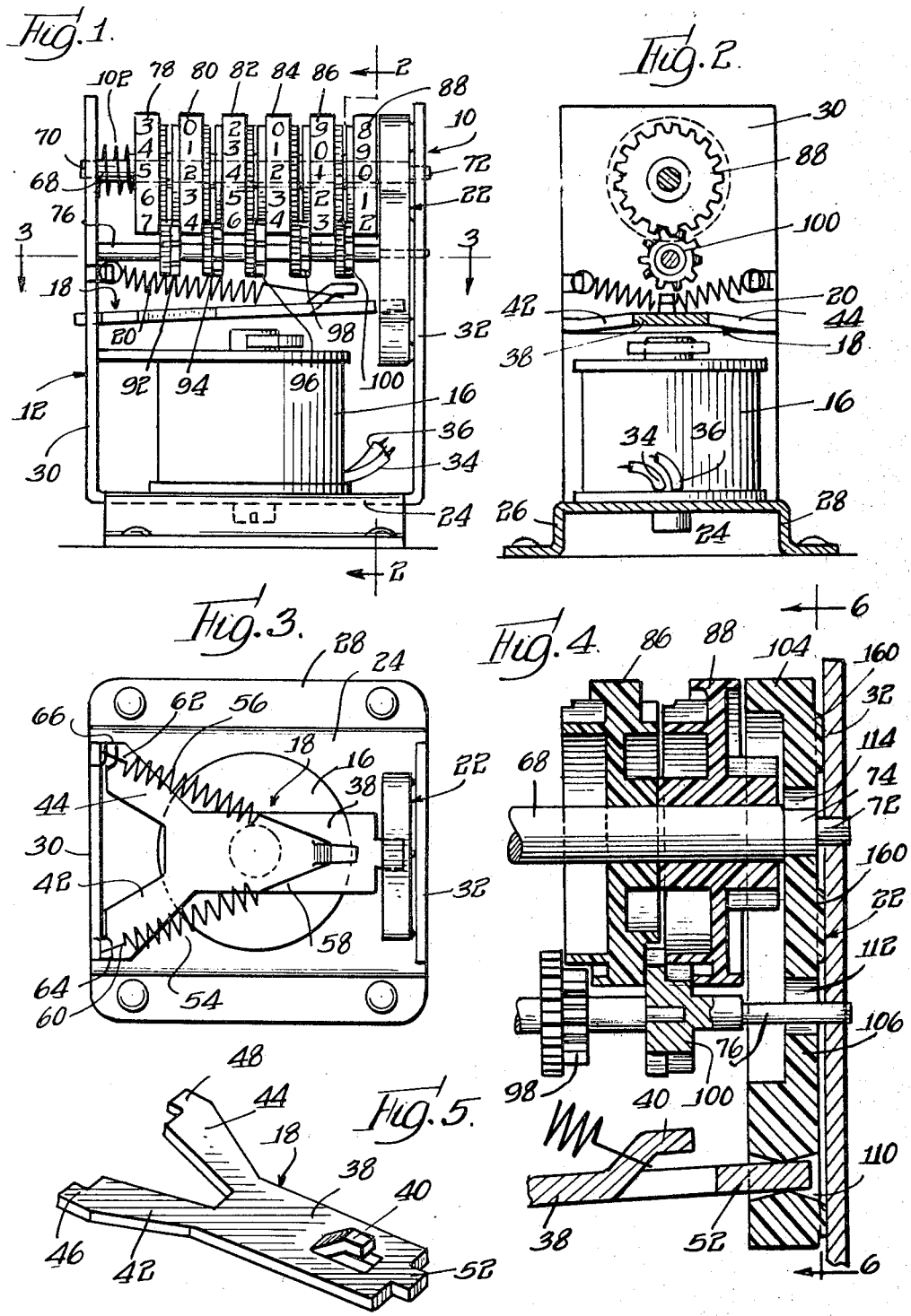

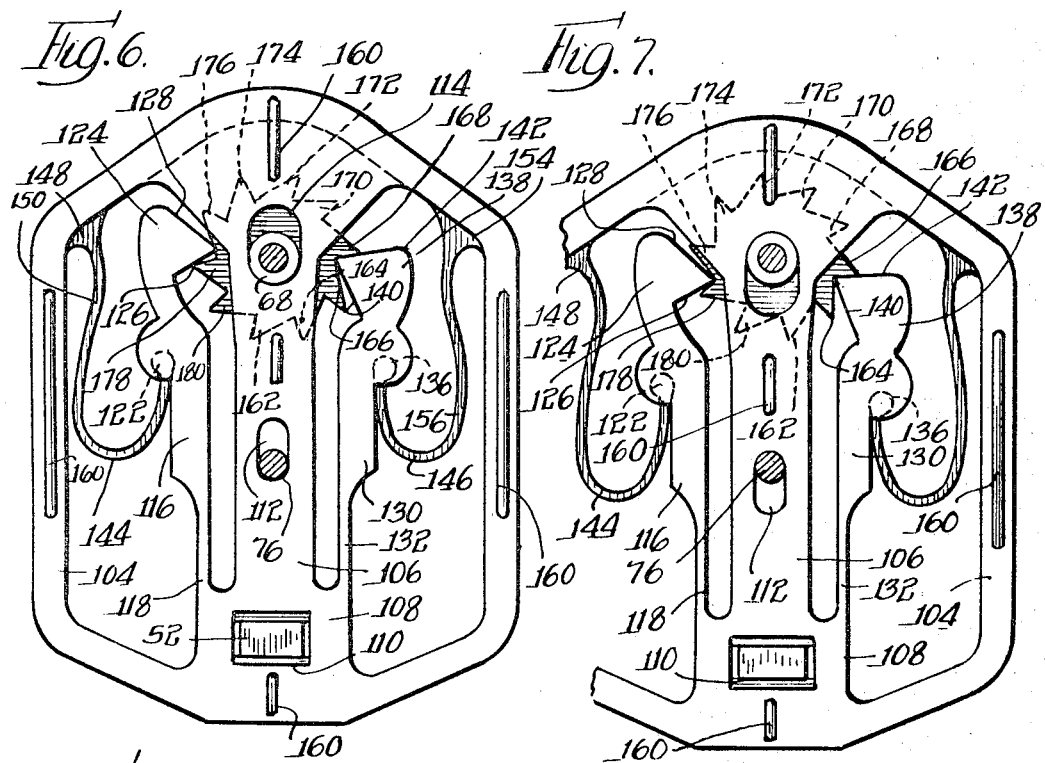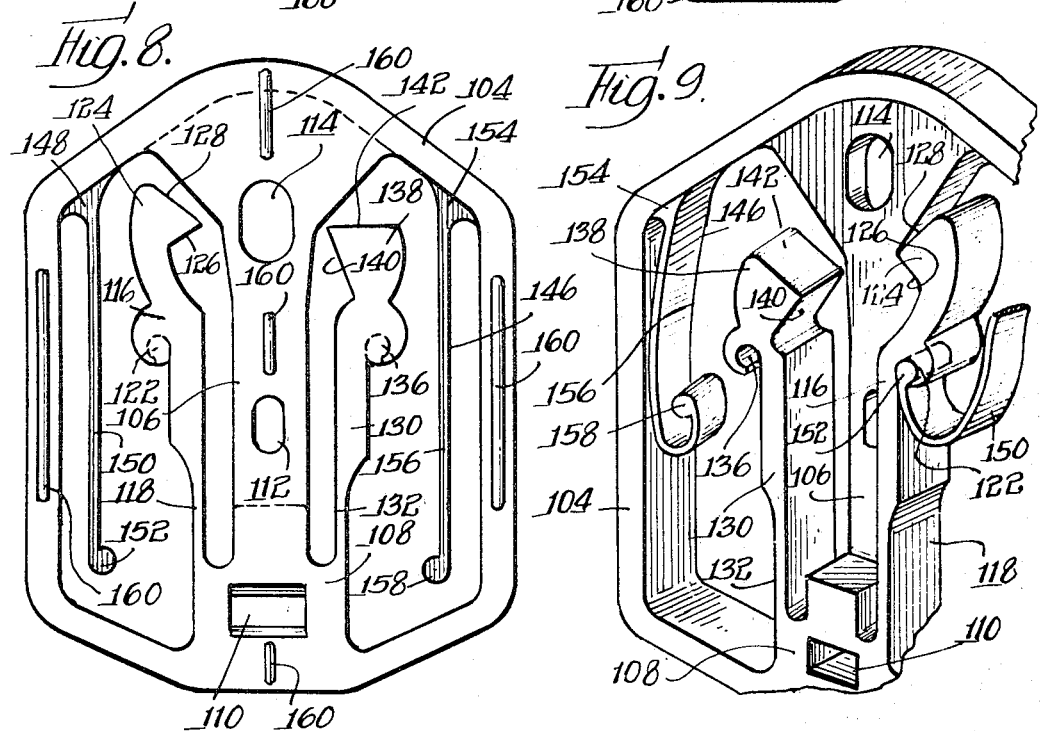

3,526,149
VERGE
Burnell J. Wollar, Barrington, Ill., assignor to ENM Company, Chicago, Ill., a corporation of Delaware
Original application Dec. 28, 1967, Ser. No. 694,165. Divided and this application Apr. 14, 1969, Ser. No. 815,986
Int. Cl. F16h 27/04
U.S. Cl. 74—142                                    10 Claims

ABSTRACT OF THE DISCLOSURE

A thermoplastic molded unitary verge used to connect a ratchet wheel with a power source. The verge includes a carrier held in alignment by a pair of shafts. A pair of pawls are formed integral with the carrier and engageable with the ratchet wheel. A pair of resilient elements are also formed integral with the carrier and are connected to the pawls to urge the pawls into engagement with the ratchet wheel.

CROSS-REFERENCE TO RELATED APPLICATION

This application is a division of patent application Ser. No. 694,165, filed Dec. 28, 1967.

BACKGROUND OF THE INVENTION

The present day business trend of providing more information and greater detailed information for managerial and accounting purposes has led to the utilization of many machines which include counters or registers where an incremental step is registered in one manner or another. A popular construction which has a high degree of acceptance for registering incremental steps is a wheel counter type register wherein a plurality of wheels are mounted on a shaft and the wheels are connected by cam wheels so that as one wheel makes a complete revolution, the adjacent wheel is revolved a given increment. For instance, using a decimal system, when one wheel makes a complete revolution, the adjacent wheel is moved 1/10 of a revolution.

Although substantial economies have been achieved in the manufacture of wheel counter type registers, one of the areas which has been a trouble spot from the standpoint of economical manufacture has been in the construction of the drive wheel drive mechanism. In a number of wheel counter type constructions, one wheel ordinarily has a ratchet wheel connected thereto or formed integrally therewith, and the ratchet wheel is driven by a pair of pawls, which pawls are ordinarily mounted on a carrier and the carrier is moved by a power source. The pawls are ordinarily held in engagement with the ratchet wheel by a pair of compression springs. The cost of manufacture of the various parts of the drive mechanism, including the carrier, the pawls, the springs, and the various pins and guides, contributes to a substantial portion of the cost of the counter construction.

SUMMARY OF THE INVENTION

The present invention relates to an improved verge construction which may be used in a wheel counter type register or in any other application where incremental steps must be recorded. The present verge is a molded thermoplastic unitary verge which includes a number of operative elements, all of which operative elements are simultaneously molded in one part. The verge may be easily and economically positioned in a counter or other device to connect the power source with a ratchet wheel. The construction of the present verge and the arrangement of the other parts of the counter relative to the verge is unique in that there is no need to provide guides for the verge and the operative elements connecting the ratchet wheel and the power source are contained in a single molded part. The verge includes a carrier which provides a frame for the various operative parts. Formed integral with the carrier is a pair of pawls or operator elements which are engageable with the ratchet wheel. The pawls are urged toward the ratchet wheel by a pair of springs or resilient elements which are long, thin, flat elements which connect the pawls to the frame. The resilient elements are formed as an integral part of the verge so that it is not necessary to make separate parts for the elements, and the verge is substantially pre-assembled upon molding. It is therefore a principal object of the present invention to provide an improved construction for a verge in the form of a single unitary part.

It is a further object of the herein-disclosed invention to provide an improved construction for a unitary article of manufacture molded of a thermoplastic resin, wherein the article includes a frame or carrier, an operator element formed integral with the carrier, and a resilient element connecting the carrier and the operator element to urge the operator element in a given direction.

It is a still further object of this invention to provide a simple and economical construction for a verge for use in a wheel counter type register.

Other objects and uses of the present invention will become readily apparent to those skilled in the art upon a perusal of the following specification, in light of the accompanying drawings.

BRIEF DESCRIPTION OF THE DRAWINGS

FIG. 1 is a side-elevational view of a specific counter using the present invention wherein the housing has been removed in order to show the interior construction of the counter;

FIG. 2 is a cross-sectional end view of the counter shown in FIG. 1 taken on line 2—2 of FIG. 1;

FIG. 3 is a cross-sectional plan view taken on line 3—3 of FIG. 1;

FIG. 4 is an enlarged cross-sectional view showing a portion of the counter of FIG. 1 showing a pair of number wheels and cam wheels mounted on an indicator shaft and a cam shaft, respectively, a ratchet wheel formed integral with one of the number wheels, and a verge embodying the instant invention slideably mounted on the shafts and connected to an armature;

FIG. 5 is a perspective view of an armature which is shown in side elevation in FIG. 1 and plan view in FIG. 3;

FIG. 6 is a cross-sectional view taken on line 6—6 of FIG. 4 showing the construction of the verge and showing the pawls in their rest or initial position relative to the ratchet wheel;

FIG. 7 is a fragmentary view substantially identical to FIG. 6; however, showing the pawls in an attitude wherein the ratchet wheel is partially turned;

FIG. 8 is a plan view of the verge shown in FIGS. 6 and 7, as the verge is in its initial molded attitude prior to connection of the resilient elements to the operator elements; and FIG. 9 is a partial perspective view of the verge shown in FIGS. 6, 7 and 8, showing some of the details of construction.

DESCRIPTION OF THE PREFERRED EMBODIMENT

Referring now to the drawings, and especially to FIG. 1, a counter 10 is shown therein, with a housing or cover removed in order to show the interior construction of the counter. The counter 10 generally includes a frame 12 with an indicator assembly 14 mounted on the frame. A power source 16, which in this instance is an electromagnetic coil co-operating with an armature 18, is mounted within the frame. A coil spring 20 is connected to the armature and the frame and holds the armature in a displaced position relative to the electromagnet. The armature 18 is connected to the indicator assembly by a molded unitary verge 22 which is a specific embodiment of the herein-disclosed invention. As will be seen in detail hereinafter, when the coil 16 is energized, the armature 18 is drawn toward the coil against the force of the spring to move verge 22 toward the coil. When the coil is de-energized, the spring 20 returns the armature, and the verge is moved away from the coil, thereby completing one cycle of the drive means and moving a wheel of the indicator assembly one increment.

The frame 12 is a unitary stamped frame construction which includes a coil support 24 with a pair of feet 26 and 28 formed integrally therewith. Formed integral with the coil support 24 is an upstanding armature support arm 30. An upstanding ratchet arm 32, which is substantially parallel to arm 30, is also formed integral with the support 24.

The power source, which includes the electromagnetic coil 16 and the armature 18, is conventional in its construction. The electromagnetic coil 16 is a conventional electromagnetic coil which has a pair of leads 34 and 36 which leads are connected to a suitable source of electric energy. The construction of the armature may be best seen in FIG. 5 in that the armature includes a magnet bar 38 with a spring hook 40 stamped out of the bar. At one end of the armature bar 38 there is formed integrally therewith a pair of support arms 42 and 44. Each of the support arms 42 and 44 has pivot studs 46 and 48, respectively, formed integrally therewith. The pivot studs are pivotedly mounted in pivot slots 50 of the armature support arm 30. At the other end of the magnet bar is an operator stud 52, which is pivotedly connected to the verge 22.

The coil spring 20, as may be best seen in FIG. 3, includes a pair of coil sections 54 and 56 which are joined by a hook section 58, which hook section engages the spring hook 40. The ends of coil sections 54 and 56 have spring hooks 60 and 62, respectively, formed therein to provide a means for attaching the spring to the frame. The armature support arm 30 has formed integrally therewith spring support hooks 64 and 66, to which are attached the spring hooks 60 and 62, respectively.

The indicator assembly 14 is conventional in its construction in that it includes an indicator shaft 68 which has a pair of studs 70 and 72 formed integrally therewith on opposite ends thereof. The studs 70 and 72 are rotatably mounted in arms 30 and 32, respectively, and it may be seen that the resilience of the arms, which are slightly folded toward each other, holds the indicator shaft in position. The indicator shaft has a reduced section 74 adjacent to stud 72, as may be seen in FIG. 4. A cam shaft 76 is also rotatably mounted on the frame between the arms 30 and 32.

As was mentioned above, the indicator assembly is conventional in its construction in that it includes a plurality of conventional number wheels 78, 80, 82, 84, and 86. The number wheels are rotatably mounted on the indicator shaft. A drive number wheel 88 is also rotatably mounted on the indicator shaft, and the number wheel 88 has a ratchet wheel 90 formed integral therewith. In this instance, each number wheel has the digits 0 through 9 formed on the outer surface of the wheel, as is conventional. All of the number wheels, except the drive number wheel, are driven by the adjacent number wheel through cam wheels 92, 94, 96, 98, and 100, which cam wheels are rotatably mounted on cam shaft 76. The construction of the number wheels and drive thereof is conventional and well known to those skilled in the art. A wheel spring 102 is positioned between wheel 78 and arm 30 to hold the number wheels in contact with each other and to urge the drive number wheel 88 toward the verge 22. It is readily apparent that the housing for the counter, which is not shown herein, includes a slot which is aligned with a prescribed set of numbers so that a person viewing the wheels would see only one digit on each wheel. Thereby, the wheel would give an indication of a particular count at a given instance, as is well known to those skilled in the art.

The verge 22, which provides a driving connection between the power source and the indicator assembly, is a single molded piece of thermoplastic material. In this instance, the verge is made of acetal homopolymer. However, such materials as, acetal copolymer, nylon, polycarbonate, cellulose acetate butyrate, chlorinated polyether, and other similar thermoplastic compounds, could be used. These materials may be unfilled or filled. The filling material may be selected from such materials as, molybdenum disulphide, graphite, tetrafluoroethylene, or other friction reducing materials. It should be appreciated that the utilization of a friction reducing filler material in the verge material makes the verge suitable for use in many applications where reduction of friction is highly important.

Referring now to FIGS. 6 through 9, the construction of the verge is best shown therein. The verge includes a generally O-shaped carrier 104, which has a center post 106 bisecting the carrier. The post includes a base 108 which has an operator stud receptacle 110 formed therein. Also formed in the post is a cam shaft slot 112 and an indicator shaft slot 114. It is important to note that the center lines of the indicator shaft slot 114, cam shaft slot 112 and the operator stud receptacle 110 are in line, for reasons which will become apparent hereinafter.

The verge includes a first operator element or first pawl 116, which pawl 116 is hingedly secured to base 108 by a thin hinge section 118. The pawl 116 includes a body portion 120 which has a receptacle 122 formed therein. The pawl also has a pawl head 124 formed on the free end of the pawl. The pawl head 124 has a pair of operator surfaces 126 and 128. A second operator element or second pawl 130 is also formed integral with the base 108 and is connected thereto by a second thin hinge section 132. The second pawl 130 includes a body portion 134 which has a second receptacle 136. A second pawl head 138 is formed integral with the free end of the second pawl. The second pawl head has a pair of second operator surfaces 140 and 142.

The pawl heads 124 and 138 are constantly urged toward each other by a pair of resilient elements 144 and 146, respectively. The resilient elements or springs 144 and 146 are thin, long, flat springs, which are folded on themselves, as may be seen in FIGS. 6 and 7. The resilient element 144 includes an enlarged foot 148, which foot is formed integral with the carrier, with an elongated, thin, flat body 150 and a cylindrical head 152 formed integral with the free end of the body. The resilient element 146 also has a foot 154, which foot 154 is formed integral with the carrier, and a long, thin, flat body 156 which terminates in a cylindrical head 158. Each of the long, thin bodies 150 and 156 in this particular instance is identical in construction to the other body and has a length of 0.643 inch, a width of 0.115 inch and a thickness of 0.010 inch. As was mentioned above, each of the resilient elements is folded on itself so that the cylindrical heads 152 and 158 are positioned in receptacles 122 and 136, respectively, thereby connecting the resilient elements to the pawls, and urging constantly the pawls toward each other.

The verge includes a plurality of slides 160 which are formed integral with the carrier and the post for engagement with the ratchet arm 32. Looking to FIG. 8, it may be seen that the verge is molded as a single unitary part. There is only one molding operation for the verge. After the verge is molded, the resilient elements are folded on themselves in excess of 90° and the heads 152 and 158 are positioned in their respective receptacles of the pawls to urge constantly the pawls toward each other.

As was mentioned above, the drive number wheel 88 has the ratchet wheel 90 formed integral therewith. In this instance, the indicator uses numbers which are based on 10 so that the drive number wheel is divided into 10 increments. The ratchet has 10 teeth. These teeth are teeth 162, 164, 166, 168, 170, 172, 174, 176, 178, and 180. As may be seen in FIGS. 6 and 7, the pawl heads 124 and 138 engage the teeth of the ratchet wheel.

The operation of the instant counter is conventional in that an electrical pulse is delivered from a convenient source through leads 34 and 36 to the electromagnet 16. The electromagnet attracts the magnet bar 38 so that the armature 18 is pulled toward the electromagnet. The armature bar pivots about the pivot studs 46 and 48, which engage the armature support arm 30, against the spring 20. The armature has its operator stud 52 positioned in the operator stud receptacle 110 of the verge, as may be seen in FIG. 4. Looking now to FIG. 6, which shows the verge in its initial or rest position, it may be seen that operator surface 126 of pawl head 124 engages the back side of ratchet tooth 178, while the operator surface 140 of pawl head 138 engages the front side of ratchet tooth 166. When the armature moves toward the electromagnet, the stud 52 in receptacle 110 moves the entire verge down toward the electromagnet.

It is important to notice at this point that the cam shaft 72 in slot 112 and the reduced section 74 of the indicator shaft 68 in slot 114 provide a guide for the verge. It is also important to note that the armature is aligned with the axes of these slots so that as the armature pivots about the armature support arm, the verge moves with the armature, but in a restricted path and in a restricted amount. It should also be noted that the slides 160 engage the ratchet arm 32 and there is substantially a light contact between the slides and the ratchet arm so that there is a minimum of friction between the verge and the arm. In order to further reduce friction, the verge may be filled with a friction reducing material, as outlined above.

As the verge moves down, the surface 126 of pawl 124 pushes the tooth 178 ahead of it and the front surface of tooth 166 which engages the surface 140 of pawl head 138 forces the pawl head out about the hinged section 132 against the resilience of resilient element 146. Just before the armature comes to the end of the stroke, that is, when the shafts reach the end of their respective slots, the front surface of tooth 166 passes by the operating surface 140 so that the resilient element 146, which constantly urges the pawl head 138 toward pawl head 124, forces the pawl head 138 to drop into engagement with the succeeding tooth 164, as may be seen in FIG. 7. At the end of the stroke of the armature, the attitude of the pawls relative to the ratchet wheel is that shown in FIG. 7.

The interruption of electrical current to the electromagnet causes the magnet to be de-energized, thereby allowing the spring 20 to return the armature 18. When the armature 18 is returned, the operator surface 142 of pawl head 138 engages the back side of ratchet tooth 166, rotating the ratchet wheel in a counterclockwise direction. The operator surface 128 of head 124 engages the front side of tooth 176 and that surface rides over the tooth as the wheel rotates and the verge moves upward relative to the shafts. Just before the armature reaches the end of its stroke, the pawl head 124 passes over the front side of the tooth 176 and resilient element 144 causes the pawl head 124 to drop behind tooth 176, and the pawls assume substantially the same posture shown in FIG. 6 in an attitude ready for another cycle. It may be appreciated that inasmuch as there are 10 teeth, 10 cycles of the verge causes the drive number wheel 88 to make a complete revolution, and the drive between the adjacent number wheels through the cam wheels is well known to those skilled in the art.

Although the construction of the verge has been set forth in detail for use in connection with a counter, it may be readily appreciated that the novel construction of a unitary device which has a resilient element formed integral with the device may have many other varied applications. It is to be expressly understood that the instant disclosure is solely for the purpose of setting forth a specific embodiment of the invention as required under the applicable statute. It is to be expressly understood that those skilled in the art may make various modifications and changes in the subject device without departing from the spirit and scope of the present invention. It is to be expressly understood that the instant invention is limited only by the appended claims.

What is claimed is:

1. An integral molded thermoplastic resin unitary verge used to connect a ratchet wheel with a power source including, a carrier, an operator element formed integral with the carrier, and a resilient element connecting the carrier and the operator element to urge the operator element in a given direction.

2. An integral molded thermoplastic resin unitary verge used to connect a ratchet wheel with a power source as defined in claim 1, wherein the resilient element has one end formed integral with the carrier and the other end is connected to the operator element.

3. An integral molded thermoplastic resin unitary verge used to connect a ratchet wheel with a power source as defined in claim 1, wherein the resilient element has one end formed integral with the carrier and the other end has an enlarged head, and said operator element has a receptacle adapted to receive the enlarged head of the resilient element, whereby positioning of the enlarged head in the receptacle of the operator element connects the resilient element to the operator element.

4. An integral molded thermoplastic resin unitary verge used to connect a ratchet wheel with a power source as defined in claim 1, wherein the resilient element is relatively thin and elongated.

5. An integral molded thermoplastic resin unitary verge used to connect a ratchet wheel with a power source as defined in claim 1, wherein the resilient element is elongated and is relatively thin and is folded at an angle in excess of 90°.

6. An internal molded thermoplastic resin unitary verge used to connect a ratchet wheel with a power source as defined in claim 1, wherein the resilient element is elongated and is relatively thin and is folded on itself.

7. An integral molded acetal homopolymer article of manufacture including, a carrier, an operator element formed integral with the carrier, and a resilient element connecting the carrier and the operator element to urge the operator element in a given direction.

8. An integral molded thermoplastic resin unitary verge used to connect a ratchet wheel with a power source as defined in claim 1, wherein the resilient element is elongated and relatively thin and has one end formed integral with the carrier and the other end has an enlarged head, and said operator element has a receptacle adapted to receive the enlarged head of the resilient element, whereby positioning of the enlarged head in the receptacle of the operator element folds the resilient element in excess of 90° and connects the resilient element to the operator element.

9. An integral molded thermoplastic resin unitary verge used to connect a ratchet wheel with a power source as defined in claim 1, wherein the resilient element is elongated and is relatively thin, and has one end formed integral with the carrier and the other end is connected to the operator element so that the resilient element is folded on itself.

10. An integral molded thermoplastic resin article of manufacture, including a carrier, an operator element formed integral with the carrier, a resilient element connecting the carrier and the operator element to urge the operator element in a given direction, and a second operator element formed integral with the carrier and a second resilient element connecting the carrier and the second operator element to urge the operator elements toward each other.

References Cited

UNITED STATES PATENTS

| | | | |
|---|---|---|---|
| 1,651,558 | 12/1927 | Sheridan | 74—575 |
| 2,406,220 | 8/1946 | Hines | 74—577 |
| 2,426,715 | 9/1947 | Tatter | 74—143 |
| 3,279,479 | 10/1966 | Solomon | 24—137.5 |
| 3,299,724 | 1/1967 | Chandler | 74—143 |
| 3,373,622 | 3/1968 | Stautmeister | 74—159 |

OTHER REFERENCES

Du Pont "Delrin," November 1967.

WESLEY S. RATLIFF, JR., Primary Examiner